United States Patent
Wu et al.

(10) Patent No.: US 9,449,646 B2
(45) Date of Patent: Sep. 20, 2016

(54) METHODS AND SYSTEMS FOR MEDIA FILE MANAGEMENT

(71) Applicant: HTC CORPORATION, Taoyuan, Taoyuan County (TW)

(72) Inventors: Jing-Lung Wu, Taoyuan (TW);
Hsin-Ti Chueh, Taoyuan (TW);
Jenn-Wein Wu, Taoyuan (TW);
Lo-Chien Lee, Taoyuan (TW);
Wen-Yuan Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 407 days.

(21) Appl. No.: 14/050,611

(22) Filed: Oct. 10, 2013

(65) Prior Publication Data

US 2014/0365483 A1 Dec. 11, 2014

Related U.S. Application Data

(60) Provisional application No. 61/833,018, filed on Jun. 10, 2013.

(51) Int. Cl.
| | | |
|---|---|---|
| G10H 1/00 | (2006.01) | |
| G10H 1/18 | (2006.01) | |
| G10H 7/00 | (2006.01) | |
| G11B 27/038 | (2006.01) | |
| G06F 17/30 | (2006.01) | |

(52) U.S. Cl.
CPC ....... *G11B 27/038* (2013.01); *G06F 17/30026* (2013.01); *G06F 17/30778* (2013.01)

(58) Field of Classification Search
CPC .................. G06F 17/30778; G06F 17/30026; G11B 27/038
USPC .......................................................... 84/615
See application file for complete search history.

(56) References Cited

U.S. PATENT DOCUMENTS

| | | | |
|---|---|---|---|
| 2005/0114388 A1* | 5/2005 | Goronzy | ................. G10L 25/00 |
| 2006/0210157 A1 | 9/2006 | Agnihotri et al. | |
| 2008/0249644 A1 | 10/2008 | Jehan | |

* cited by examiner

*Primary Examiner* — Jeffrey Donels
(74) *Attorney, Agent, or Firm* — Birch, Stewart, Kolasch & Birch, LLP

(57) ABSTRACT

Methods and systems for media file management are provided. A music file including music samples is provided. The music file is analyzed to calculate a gain for each music sample. At least one valley point is detected based on the gains of the respective music samples. A first and a second specific valley points are selected from the detected valley point, and respectively setting the first and second specific valley points as a start and an end of a music segmentation. Media data is generated for media files in the electronic device based on the music segmentation.

17 Claims, 4 Drawing Sheets

METHODS AND SYSTEMS FOR MEDIA FILE MANAGEMENT

CROSS REFERENCE TO RELATED APPLICATIONS

This application claims the benefit of U.S. Provisional Application No. 61/833,018 filed Jun. 10, 2013, the entirety of which is incorporated by reference herein.

BACKGROUND OF THE INVENTION

1. Field of the Invention

The disclosure relates generally to methods and systems for media file management, and, more particularly to methods and systems for music segmentation, and generating and/or presenting media data for a group of media files.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

Currently, a handheld device may provide image capturing (picture-taking) capabilities operating like a digital camera, and picture takers can use the image capturing (picture-taking) capabilities of the device to take images and/or videos. Due to the convenient function, taking pictures with handheld device has become a very common behavior.

Generally, the files of images and/or videos are classified into folders which are managed by a file management system of the device. Conventionally, users can distinguish between the folders according to the folder names. In some cases, it is difficult to locate a specific folder when a large amount of folders are in the device. Currently, a thumbnail corresponding to one or few images in a folder can be shown on the icon corresponding to the folder, thereby helping users to distinguish between the folders. However, the thumbnail corresponding to one or few images cannot show the complete picture of the folder. It is still hard to locate a specific folder when a large amount of folders are in the device.

BRIEF SUMMARY OF THE INVENTION

Methods and systems for media file management are provided.

In an embodiment of a method for media file management, a music file is provided, wherein the music file is divided into a plurality of music samples. The music file is analyzed to calculate a gain for each music sample, wherein the gain is a difference between an original sound loudness and a target sound loudness. At least one valley point is detected based on the gains of the respective music samples. A first specific valley point is selected from the at least one valley point, and the first specific valley point is set as a start of a music segmentation. A second specific valley point is selected from the at least one valley point, and the second specific valley point is set as an end of the music segmentation. Media data is generated for a plurality of media files in the electronic device based on the music segmentation.

An embodiment of a system for media data management comprises a storage unit and a processing unit. The storage unit comprises a plurality of media files, and a music file, wherein the music file is divided into a plurality of music samples. The processing unit analyzes the music file to calculate a gain for each music sample, wherein the gain is a difference between an original sound loudness and a target sound loudness, and detects at least one valley point based on the gains of the respective music samples. The processing unit selects a first specific valley point from the at least one valley point, and sets the first specific valley point as a start of a music segmentation. The processing unit selects a second specific valley point from the at least one valley point, and sets the second specific valley point as an end of the music segmentation. The processing unit generates media data for a plurality of media files in the electronic device based on the music segmentation.

In some embodiments, the media data is real-time generated for the media files when the media files are viewed.

In some embodiments, the generation of the media data is performed by analyzing the media files to obtain a theme for the media files, wherein the theme defines effects or transitions between the media files, and producing the media data for the media files according to the theme and a script file corresponding to the music segmentation, wherein the script file defines characteristics comprising tempos, melody, beats, cord, or chorus of the music segmentation.

In some embodiments, the step of analyzing the media files is performed by detecting faces in the respective media files, checking position information corresponding to the respective media files, checking exposure time of the respective media files, or checking taken time or date, or sharpness of the respective media files.

In some embodiments, the generation of the media data further comprises a step of selecting specific media files from the media files based on the length of the music segmentation. In some embodiments, the second specific valley point is selected according to a preferred length of user, or the number or type of the specific media files In some embodiments, a user interface is provided for adjusting the first specific valley point and the second specific valley point.

Methods for media file management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for media file management are provided.

Figure 1:
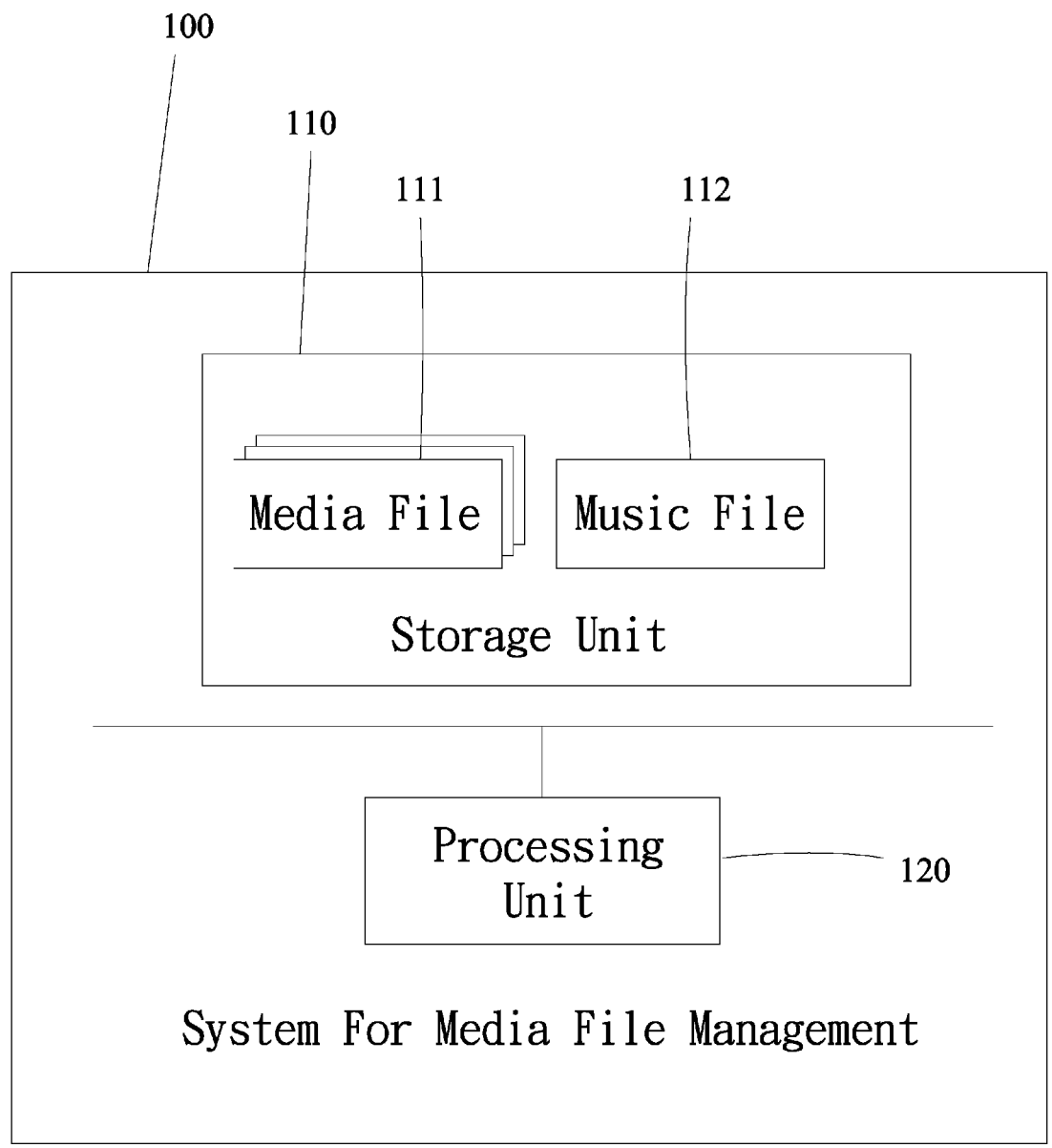
FIG. 1 is a schematic diagram illustrating an embodiment of a system for media file management of the invention.

FIG. 1 is a schematic diagram illustrating an embodiment of a system for media file management of the invention. The system for media file management 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

The system for media file management 100 comprises a storage unit 110 and a processing unit 120. The storage unit 110 comprises a plurality of media files 111, such as images, videos, music, and/or texts. In some embodiments, the texts may be from comments corresponding to the respective media file, such as image or video from at least one social network. It is understood that, in some embodiments, the system for media file management 100 can also comprise an image capture unit (not shown in FIG. 1). The image capture unit may be a CCD (Charge Coupled Device) or a CMOS (Complementary Metal-Oxide Semiconductor), placed at the imaging position for objects inside the electronic device. The image capture unit can capture the media files. It is also understood that, in some embodiments, the system for media file management 100 can also comprise an engine (not shown in FIG. 1), which can simultaneously provide at least one video of n seconds and m images in n seconds. In an example, n=4 and m=20. It is noted that, the engine may be inside or outside the electronic device. It is also understood that, in some embodiments, the system for media file management 100 can also comprise a display unit (not shown in FIG. 1). The display unit can display related figures and interfaces, and related data, such as the media files 111. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit. Additionally, the storage unit 110 can also comprise at least one music file 112. It is noted that, in the present invention, each music file may correspond to a script file, wherein the script file defines characteristics which can be defined according to tempos, melody, beats, cord, or chorus of the music file, and media data can be generated according to the script file. Additionally, in the present invention, a theme defines type or classification for media files is provided. Namely, media files 111 can be analyzed to locate a specific theme. The theme can define effects and/or transitions between the media files. The processing unit 120 can control related components of the system for media file management 100, process the music file and the media files, and perform the methods for media file management, which will be discussed further in the following paragraphs.

Figure 2:
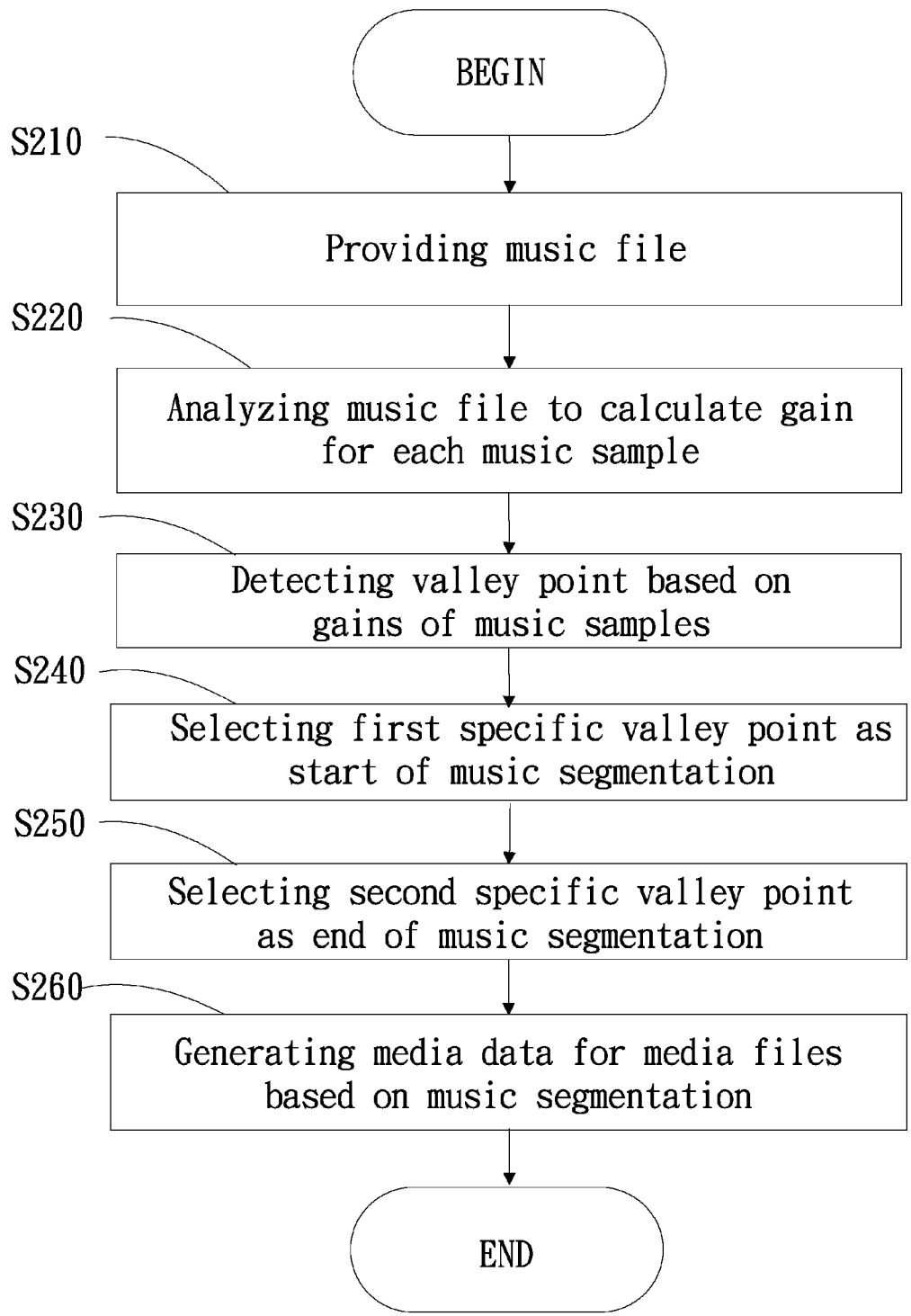
FIG. 2 is a flowchart of an embodiment of a method for media file management of the invention.

FIG. 2 is a flowchart of an embodiment of a method for media file management of the invention. The method for media file management can be used in an electronic device, such as a computer, or a portable device, such as a digital camera, a handheld device such as a mobile phone, a smart phone, a PDA, a GPS, or any picture-taking device. In the embodiment, media data is produced for media files.

In step S210, a music file is provided. It is understood that, in some embodiments, the music file can be provided or selected by users via a user interface. In step S220, the music file is divided into a plurality of music samples, and analyzed to calculate a gain for each music sample. It is understood that, the gain is a difference between an original sound loudness and a target sound loudness. It is noted that, the calculation of gain for a music file is well-known and omitted here. After the gain for each music sample is obtained, in step S230, at least one valley point is detected based on the gains of the respective music samples. In some embodiments, when the gain corresponding to a specific music sample is less than that of surrounding music samples, the specific music sample can be detected as a valley point. In some embodiments, the gain of the specific music sample must be less than a predefined threshold. It is understood that, in some embodiments, the detected valley points can be displayed in an interface for user selection. Then, in step S240, a first specific valley point is selected from the at least one valley point, and the first specific valley point is set as a start of a music segmentation. Then, in step S250, a second specific valley point is selected from the at least one valley point, and the second specific valley point is set as an end of the music segmentation. It is understood that, in some embodiments, the second specific valley point can be automatically selected according to a preferred length of user. It is noted that, the media files in the electronic device can be further selected for generating media data. In some embodiments, the second specific valley point can be selected according to the number and/or type of the selected media files. Further, in some embodiments, a user interface can be provided for adjusting the first specific valley point and the second specific valley point. After the music segmentation is set, in step S260, media data is generated for a plurality of media files in the electronic device based on the music segmentation. The generation of the media data is discussed later.

Figure 3:
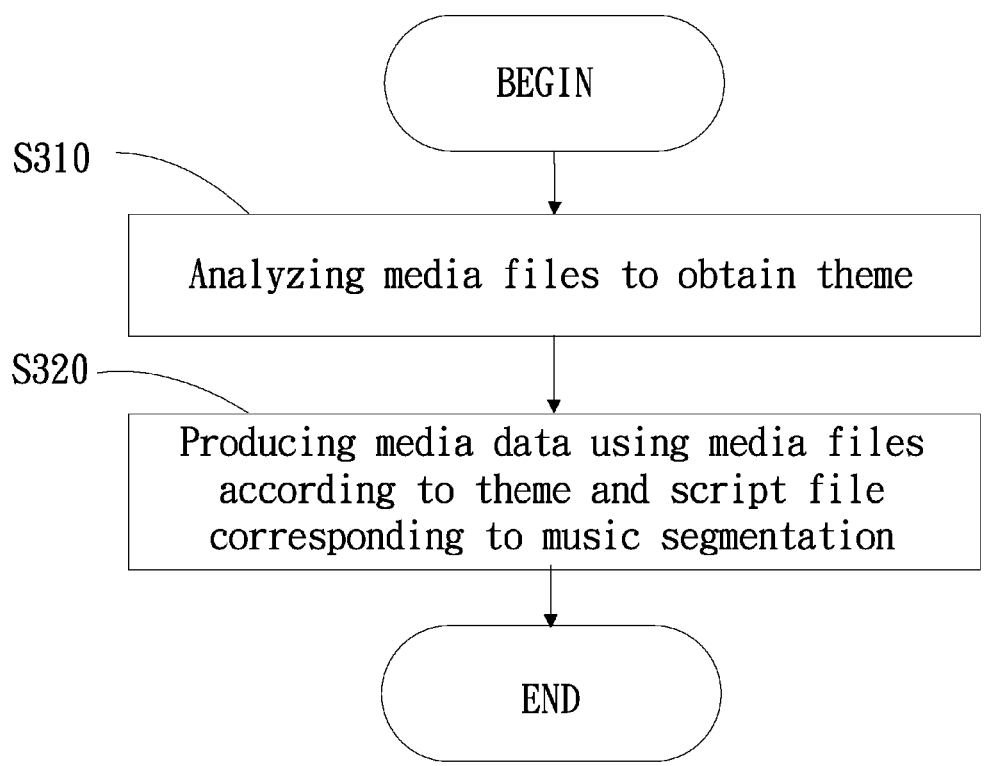
FIG. 3 is a flowchart of an embodiment of a method for generating media data of the invention.

FIG. 3 is a flowchart of an embodiment of a method for generating media data of the invention.

In step S310, a plurality of media files are analyzed to obtain a theme. Similarly, in some embodiments, the media files comprise images, videos, music, and/or texts. In some embodiments, an engine can simultaneously provide at least one video of n seconds and m images in n seconds. In an example, n=4 and m=20. It is noted that, the engine may be inside or outside the electronic device. It is understood that, in some embodiments, the theme can be a specific type or classification for the media files. For example, the theme may be Family related, Travel related, Party/Night out related, or others. The theme can define effects and/or transitions between the media files. It is noted that, the media files can be analyzed based on the content and/or the metadata of the media files to know the corresponding theme. In an example, faces can be detected in the respective media files. The detected faces can be compared with photos in the phone book and social network tags. It can be known that if the analyzed media files are suitable for family or not. In another example, the position information, such as GPS location corresponding to the respective media files can be checked to determine whether the GPS location is far from user's usual stay or the position information can link to be a route. If so, it can be identified as a travel theme. In a further example, the exposure time of the respective media files can be checked to determine whether the respective media files are captured in a dark location, such as a pub. Similarly, the GPS location of the respective media files can be checked to know whether the location is a pub or a famous spot for people to get together. If so, it can be identified as a Party/Night out theme. Further, the taken date/time of the respective media file can be used as well for theme analysis. It is noted that, the above theme and analysis manners are only examples of the embodiments, and the present invention is not limited thereto. In step S320, media data is produced using the media files according to the theme and a script file corresponding to the music segmentation, which starts at the first specific valley point, and ended at the second specific valley point. As described, the script file may define characteristics which are defined according to tempos, melody, beats, cord, or chorus of the music segmentation. Also, the theme can define effects and/or transitions between the media files. During the generation of media data, effects, such as spot light, color effect, ken burns, and others and/or transitions, such as fade in/out, rotation, zoom in/out, and others are generated between the media files, and/or applied to the media files, wherein the effects and/or transitions are aligned with the script file, such that the effects and/or the transitions can occur at the right timing. It is noted that, in some embodiments, the content for the effect and/or transition is real-time generated when the media data is played.

Figure 4:
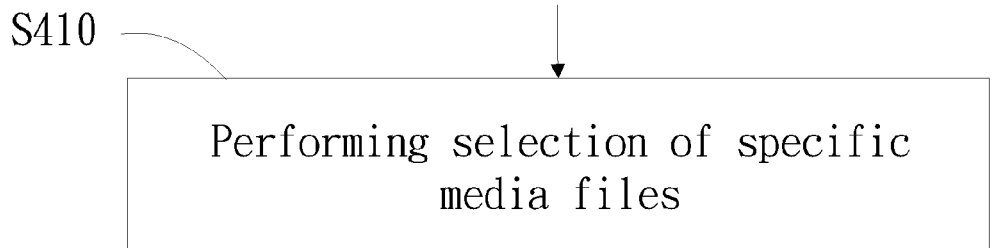
FIGS. 4-6 are flowcharts of further embodiments of the method for generating media data of the invention.
Figure 5:
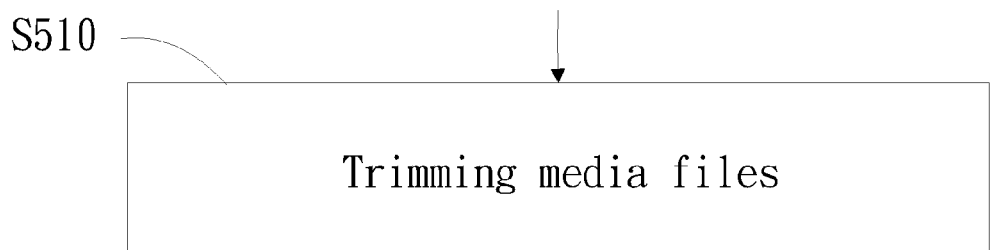
Figure 6:
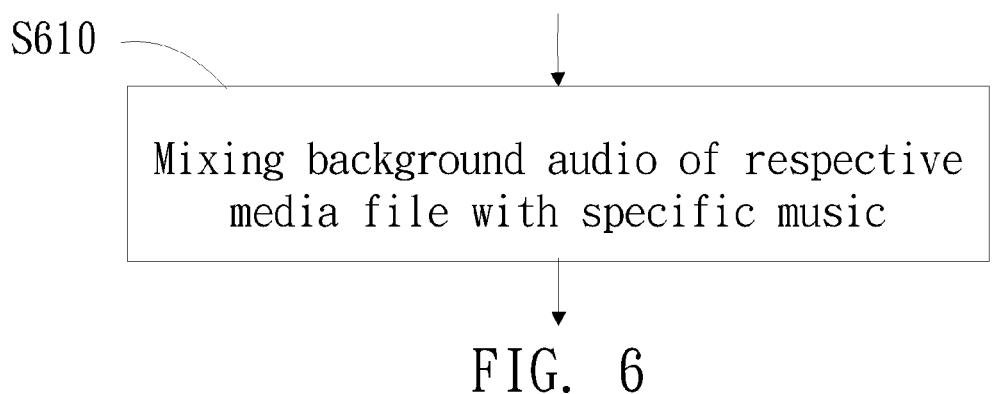

FIGS. 4-6 are flowcharts of further embodiments of the method for generating media data of the invention.

In FIG. 4, in step S410, specific media files are selected from the media files. It is understood that, in some embodiments, the selection can be performed based on contents of the respective media files, comments corresponding to the respective media files from at least one social network, position information corresponding to the respective media files, and/or historical behaviors, such as a view frequency, a share frequency, related data recorded when the respective media file is captured, and/or a zoom frequency corresponding to the respective media files. For example, the most frequently-watched/shared/zoomed items can be selected, the most commented photos/videos on a social network, such as FACEBOOK can be selected, all files in a group, which is grouped by time or location will be selected a candidates for a source of movie, the photos/videos which contain people information, such as face and smile for a certain theme, such as the family theme are selected, the photos with specific faces by face recognition linked to phone book's photos or social network tag, such as Facebook, which can be selected to create a family theme, the images which GPS location can link to a route are selected, the slow motion video for slow tempo music and vice versa are selected, and/or the contents by date and put into an order of dates can be selected. Further, blur photos and abnormal exposure photos are filtered. In some examples, the statistics data from recorder's sensors stored in the meta data of the media file can be checked to know the behavior of recorder when it is shooting. This statistics data can be used to extract/trim a meaningful video period, such as stable period video cut. Also, the taken date or time of the respective media file can be also used for selection. It is understood that, the selection rules can be various according to different requirements and applications. Above rules are only examples of the embodiment, and the present invention is not limited thereto. The selected media files can be used to produce the media data.

In FIG. 5, in step S510, the media files are trimmed to obtain the trimmed media files. In some embodiments, the periods that faces show up, at least one object is moving, and/or people is speaking are kept in the trimmed video. In some embodiments, the respective video is trimmed based on the script file, such that the trimmed video is aligned with the characteristics defined in the script file. Further, a blur video period will be filtered by checking the data stored in metadata. That data is statistics data obtained from sensors, like G-sensor Gyro when recording. Similarly, the trimming rules can be various according to different requirements and applications. Above rules are only examples of the embodiment, and the present invention is not limited thereto. The trimmed media files can be used to produce the media data.

In FIG. 6, in step S610, a background audio of the respective media file is mixed with a specific music, wherein when a human speech exists in the video, the volume of the specific music within the corresponding specific period is lowered and mixed with the background audio of the media file.

It is understood that, in some embodiments, when the media files are been viewed, the media data is real-time generated for the media files. The generated media data or a representative of the media data can be displayed for browsing. It is understood that, in some embodiments, a frame buffer used for storing the media data can be refreshed after each frame of the media data is rendered. That is, the real-time generated media data is removed after it was played. The media data is not stored as a file in the memory. In other words, image frames of the media data are not actually composed to form a media file until users trigger an instruction to export all image frames of the media data. In some embodiments, the media data can be removed once the management/viewing of the media files is completed. However, in some embodiments, the media data can be also actually stored in the memory of the electronic device for further use.

Therefore, the methods and systems for media file management of the present invention can generate music segmentation, and generate and/or present media data for a group of media files based on the music segmentation, thereby assisting user to navigate the media files in the electronic device.

Methods for media file management, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for media file management for use in an electronic device, comprising:
   providing a music file, wherein the music file is divided into a plurality of music samples;
   analyzing the music file to calculate a gain for each music sample, wherein the gain is a difference between an original sound loudness and a target sound loudness;
   detecting at least one valley point based on the gains of the respective music samples;
   selecting a first specific valley point from the at least one valley point, and setting the first specific valley point as a start of a music segmentation;

selecting a second specific valley point from the at least one valley point, and setting the second specific valley point as an end of the music segmentation; and generating media data for a plurality of media files in the electronic device based on the music segmentation.

2. The method of claim 1, wherein the media data is real-time generated for the media files based on the music segmentation while the media files are viewed.

3. The method of claim 1, wherein the generation of the media data comprises steps of:

analyzing the media files to obtain a theme for the media files, wherein the theme defines effects or transitions between the media files; and producing the media data for the media files according to the theme and a script file corresponding to the music segmentation, wherein the script file defines characteristics which are defined according to tempos, melody, beats, cord, or chorus of the music segmentation.

4. The method of claim 3, wherein the step of analyzing the media files is performed by detecting faces in the respective media files, checking position information corresponding to the respective media files, checking exposure time of the respective media files, or checking taken time or date, or sharpness of the respective media files.

5. The method of claim 3, wherein the generation of the media data further comprises a step of selecting specific media files from the media files based on the length of the music segmentation.

6. The method of claim 5, wherein the second specific valley point is selected according to a preferred length of user, or the number or type of the specific media files.

7. The method of claim 1, further comprising providing a user interface for adjusting the first specific valley point and the second specific valley point.

8. The method of claim 1, wherein the media files comprises images, videos, music, or texts.

9. A system for media file management for use in an electronic device, comprising:

a storage unit comprising a plurality of media files, and a music file, wherein the music file is divided into a plurality of music samples; and a processing unit analyzing the music file to calculate a gain for each music sample, wherein the gain is a difference between an original sound loudness and a target sound loudness, detecting at least one valley point based on the gains of the respective music samples, selecting a first specific valley point from the at least one valley point, and setting the first specific valley point as a start of a music segmentation, selecting a second specific valley point from the at least one valley point, and setting the second specific valley point as an end of the music segmentation, and generating media data for a plurality of media files in the electronic device based on the music segmentation.

10. The system of claim 9, wherein the processing unit real-time generates the media data for the media files based on the music segmentation while the media files are viewed.

11. The system of claim 9, wherein the processing unit generates the media data by analyzing the media files to obtain a theme for the media files, wherein the theme defines effects or transitions between the media files, and producing the media data for the media files according to the theme and a script file corresponding to the music segmentation, wherein the script file defines characteristics which are defined according to tempos, melody, beats, cord, or chorus of the music segmentation.

12. The system of claim 11, wherein the processing unit analyzes the media files by detecting faces in the respective media files, checking position information corresponding to the respective media files, checking exposure time of the respective media files, or checking taken time or date, or sharpness of the respective media files.

13. The system of claim 11, wherein the processing unit generates the media data by further selecting specific media files from the media files based on the length of the music segmentation.

14. The system of claim 13, wherein the processing unit selects the second specific valley point according to a preferred length of user, or the number or type of the specific media files.

15. The system of claim 9, wherein the processing unit further provides a user interface for adjusting the first specific valley point and the second specific valley point.

16. The system of claim 9, wherein the media files comprises images, videos, music, or texts.

17. A machine-readable storage medium comprising a computer program, which, when executed, causes a device to perform a method for media file management, wherein the method comprises:

providing a music file, wherein the music file is divided into a plurality of music samples;

analyzing the music file to calculate a gain for each music sample, wherein the gain is a difference between an original sound loudness and a target sound loudness;

detecting at least one valley point based on the gains of the respective music samples;

selecting a first specific valley point from the at least one valley point, and setting the first specific valley point as a start of a music segmentation;

selecting a second specific valley point from the at least one valley point, and setting the second specific valley point as an end of the music segmentation; and generating media data for a plurality of media files in the electronic device based on the music segmentation.

* * * * *